(12) United States Patent
Smith et al.

(10) Patent No.: US 9,403,279 B2
(45) Date of Patent: Aug. 2, 2016

(54) ROBOTIC SYSTEM WITH VERBAL INTERACTION

(71) Applicant: The Boeing Company, Chicago, IL (US)

(72) Inventors: Scott D. G. Smith, Issaquah, WA (US); Ronald Carl Provine, Bothell, WA (US); Mario A. Mendez, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 247 days.

(21) Appl. No.: 13/916,863

(22) Filed: Jun. 13, 2013

(65) Prior Publication Data

US 2014/0372116 A1 Dec. 18, 2014

(51) Int. Cl.
*G10L 15/26* (2006.01)
*B25J 13/00* (2006.01)
*G10L 15/22* (2006.01)

(52) U.S. Cl.
CPC .............. *B25J 13/003* (2013.01); *G10L 15/22* (2013.01); *Y10S 901/02* (2013.01)

(58) Field of Classification Search
CPC . G05D 1/0274; G05D 1/0227; G05D 1/0225; G05D 1/0088; G05D 1/0246; G05D 2201/0209; G05D 1/0251; G05D 1/0278; G05D 2201/0216; G05D 1/0238; G05D 1/0038; G05D 1/0061; G05D 1/021; G05D 1/0289; G05D 2201/0207; B65G 59/005; B25J 9/1669; B25J 9/0087; B25J 11/0005; B25J 13/084; B25J 9/163; B25J 9/1671; B25J 9/1676; B25J 9/1697; B25J 9/1687; B25J 11/00; B25J 13/085; B25J 9/1633

USPC .............. 704/231, 235, 270, 275, 272, 270.1; 709/226; 700/259

See application file for complete search history.

(56) References Cited

U.S. PATENT DOCUMENTS

| | | | |
|---|---|---|---|
| 8,346,391 B1 | 1/2013 | Anhalt et al. | |
| 8,447,863 B1* | 5/2013 | Francis et al. | 709/226 |
| 2002/0107695 A1* | 8/2002 | Roth | G10L 15/22 704/275 |
| 2002/0154986 A1* | 10/2002 | Leblanc | B65G 59/005 414/795 |
| 2008/0301072 A1* | 12/2008 | Nagatsuka | B25J 9/1669 706/12 |
| 2010/0256814 A1* | 10/2010 | Smith | 700/259 |
| 2012/0089392 A1* | 4/2012 | Larco et al. | 704/231 |
| 2012/0316679 A1 | 12/2012 | Papaefstathiou et al. | |

\* cited by examiner

*Primary Examiner* — Huyen Vo
(74) *Attorney, Agent, or Firm* — Yee & Associates, P.C.

(57) ABSTRACT

A method and apparatus for moving an object. A verbal instruction for moving the object is received. The verbal instruction is converted into text. A logical representation of the verbal instruction is generated. A movement of a robotic system that corresponds to the verbal instruction for moving the object using a model of an environment in which the object and the robotic system are located is identified. A set of commands used by the robotic system for the movement of the robotic system is identified. The set of commands is sent to the robotic system.

21 Claims, 8 Drawing Sheets

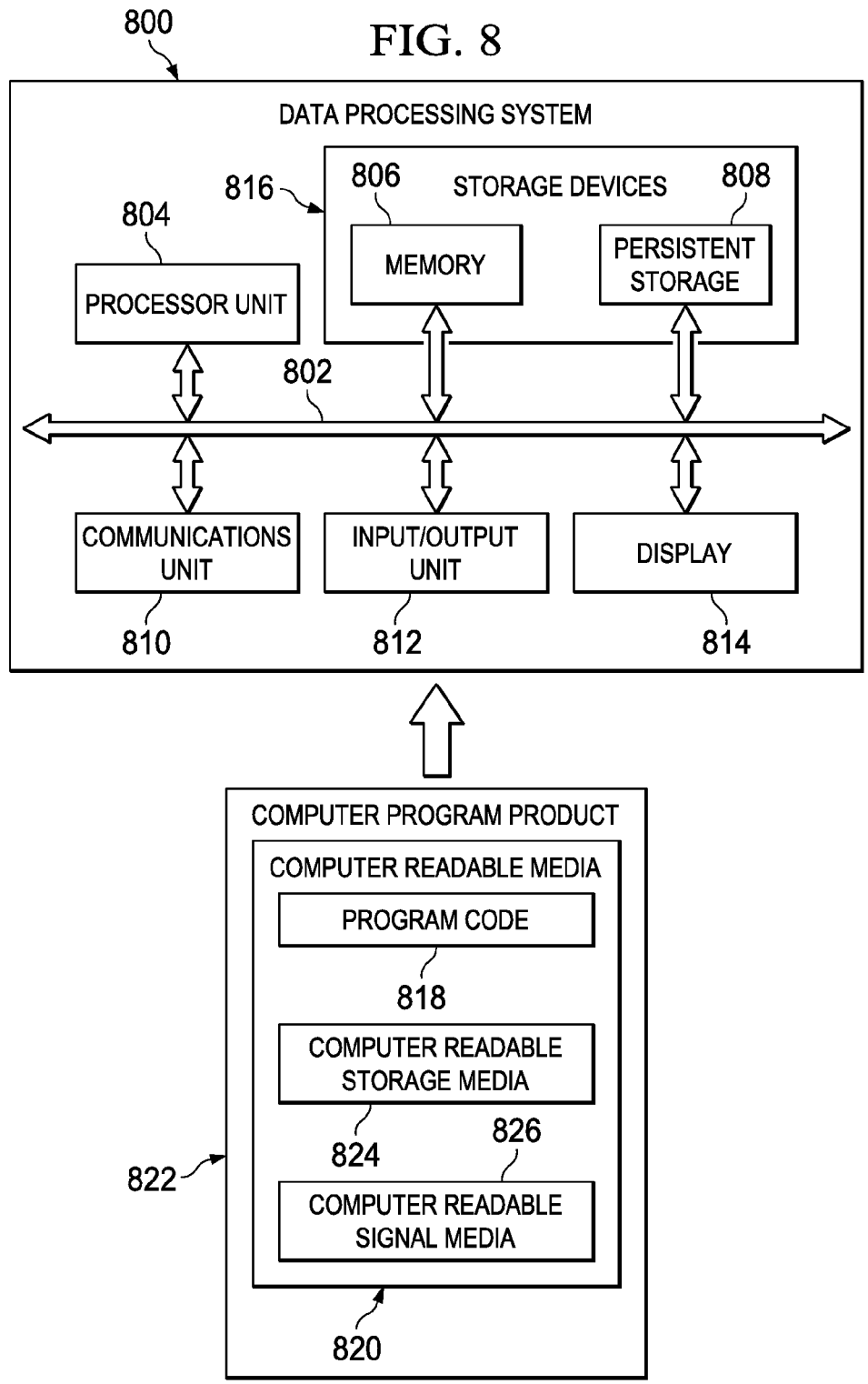

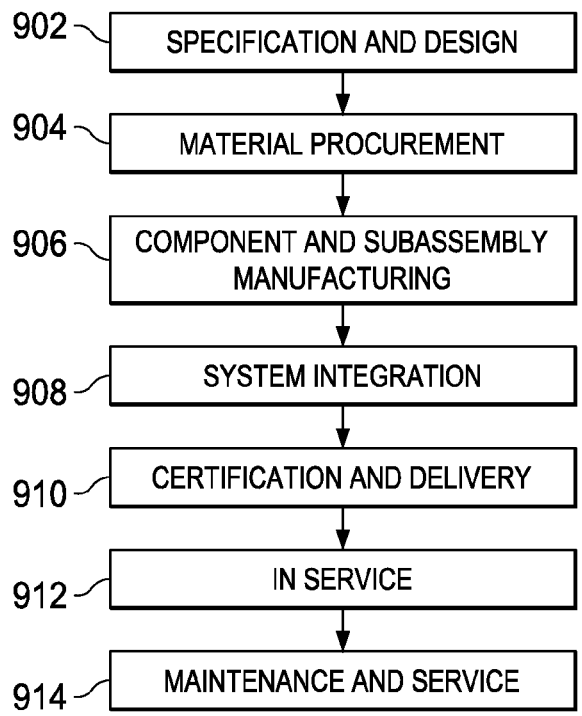
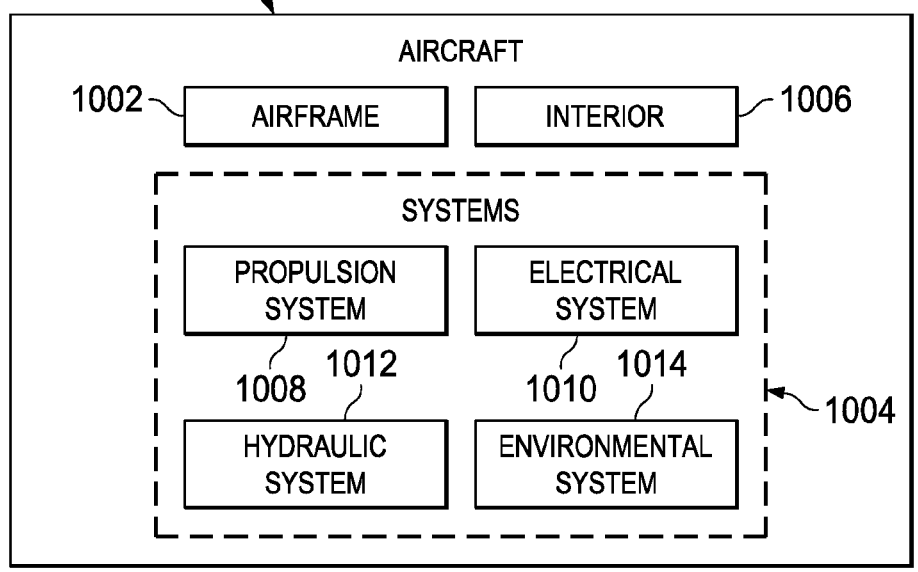

ROBOTIC SYSTEM WITH VERBAL INTERACTION

BACKGROUND INFORMATION

1. Field

The present disclosure relates generally to manufacturing and in particular, to moving objects during manufacturing. Still more particularly, the present disclosure relates to moving objects using robotic systems.

2. Background

In manufacturing products, objects may be moved from one location to another location during the manufacturing process. Robotic systems may be used to perform these types of operations repeatedly. With robotic systems, the movement of objects from one location to another location may be performed in a manner that reduces labor expenses, increases the speed of manufacturing products, improves the precision of the placement of objects, increases safety, or some combination thereof.

In a manufacturing environment, objects such as parts for a product on a moving conveyor belt may be removed from the conveyor belt using a robotic system and placed into a bin, onto a platform, or in some other location. This type of robotic system may be referred to as a pick and place robot.

For example, a pick and place robot may pick up semiconductor chips from a conveyor belt and place the semiconductor chips onto a platform where a printed circuit board is located. The robotic system may place the semiconductor chips on the platform so that the chips may be attached to the printed circuit board. In other illustrative examples, a robotic system may actually place the semiconductor chips on the printed circuit board in locations where the semiconductor chips are to be attached to the printed circuit board.

These types of movements of objects performed by the pick and place robot are often performed repeatedly. As a result, the paths of the movements may be programmed into the pick and place robot. For example, an operator, such as a robotic programmer, may write a program for the robotic system to pick up objects in a first location and place those objects in a second location. The program may identify paths of movement from a first location to a second location for parts. This type of programming involves time and effort by an experienced programmer.

In other cases, an operator on the manufacturing floor may teach a pick and place robot the path of movement for moving parts. For example, the operator may control movement of the pick and place robot from a first location where an object is to be picked up to a second location where the object is to be placed using a device such as a handheld control terminal. In this manner, the operator defines a path of movement for the pick and place robot. This path of movement may be stored in the pick and place robot and used for moving objects.

This process of teaching the pick and place robot a path may be more time-consuming than desired. The operator focuses their time and attention on the handheld control terminal instead of on the particular task to be performed.

In other cases, the control terminal may be a remote location. As a result, the operator may also have their attention diverted away from the task to view a display for teaching the pick and place robot a sequence of actions for moving objects from a first location to a second location.

Writing programs and teaching paths to pick and place robots may be more time-consuming and difficult than desired. Additionally, operators with specialized knowledge are needed for writing programs or modifying programs. Also, having operators on the manufacturing floor to teach paths to pick and place robots takes time and attention away from performing tasks for manufacturing products.

Therefore, it would be desirable to have a method and apparatus that take into account at least some of the issues discussed above, as well as other possible issues.

SUMMARY

In one illustrative embodiment, an apparatus comprises an instruction processor. The instruction processor is configured to receive a verbal instruction for moving an object. The instruction processor is further configured to convert the verbal instruction into text. The instruction processor is still further configured to generate a logical representation of the verbal instruction. The instruction processor is further configured to identify a movement of a robotic system that corresponds to the verbal instruction for moving the object using a model of an environment in which the object and the robotic system are located. The instruction processor is still further configured to identify a set of commands used by the robotic system for the movement of the robotic system identified. The instruction processor is further configured to send the set of commands to the robotic system.

In yet another illustrative embodiment, a pick and place robotic system comprises a robotic system, a dialog manager, a controller, and a robotic interface. The robotic system is configured to move an object from a first location to a second location. The dialog manager is configured to receive a verbal instruction for moving the object from the first location to the second location. The dialog manager is further configured to convert the verbal instruction into text. The dialog manager is still further configured to generate a logical representation of the verbal instruction. The controller is configured to identify a movement of the robotic system that corresponds to the verbal instruction for moving the object from the first location to the second location from a model of an environment in which the object and the robotic system are located. The controller is further configured to identify a set of commands used by the robotic system for the movement of the robotic system identified. The controller is still further configured to send the set of commands to the robotic system. The robotic interface is configured to receive the set of commands from the controller. The robotic interface is further configured to place the commands in a format used by the robotic system. The robotic interface is still further configured to send the set of commands to the robotic system.

In yet another illustrative embodiment, a method for moving an object is presented. A verbal instruction for moving the object is received. The verbal instruction is converted into text. A logical representation of the verbal instruction is generated. A movement of a robotic system that corresponds to the verbal instruction for moving the object using a model of an environment in which the object and the robotic system are located is identified. A set of commands used by the robotic system for the movement of the robotic system is identified. The set of commands is sent to the robotic system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of wherein:

FIG. 8 is an illustration of a block diagram of a data processing system in accordance with an illustrative embodiment;

FIG. 9 is an illustration of an aircraft manufacturing and service method in the form of a block diagram in accordance with an illustrative embodiment; and FIG. 10 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that it would be desirable to reduce the time and effort needed to move parts between locations using a robotic system. The illustrative embodiments recognize and take into account that it would be desirable to allow an operator on a manufacturing floor to more easily change movements performed by robotic systems that move objects during the manufacturing of a product.

The illustrative embodiments recognize and take into account that verbal interaction with a robotic system may allow an operator to more easily provide instructions to a robotic system with respect to the movement of objects from a first location to a second location. For example, the illustrative embodiments recognize and take into account that changing the manner in which objects are moved by robotic systems without a programmer is desirable.

The illustrative embodiments also recognize and take into account that verbal interaction with a robotic system may also increase the flexibility of robotic systems and reduce the amount of time that an operator spends in teaching or programming a robotic system. Such a system may also reduce the need for specialized robot programming skills when implementing such a system.

Thus, the illustrative embodiments provide a method and apparatus for moving objects. In one illustrative example, an apparatus comprises an instruction processor. The instruction processor is configured to receive a verbal instruction for moving an object, convert the verbal instruction into text, and generate a logical representation of the verbal instruction. The instruction processor is further configured to identify a movement of a robotic system that corresponds to the verbal instruction for moving the object using a model of an environment in which the object and robotic system are located, identify a set of commands used by the robotic system for the movement of the robotic system identified, and send the set of commands to the robotic system.

Figure 1:
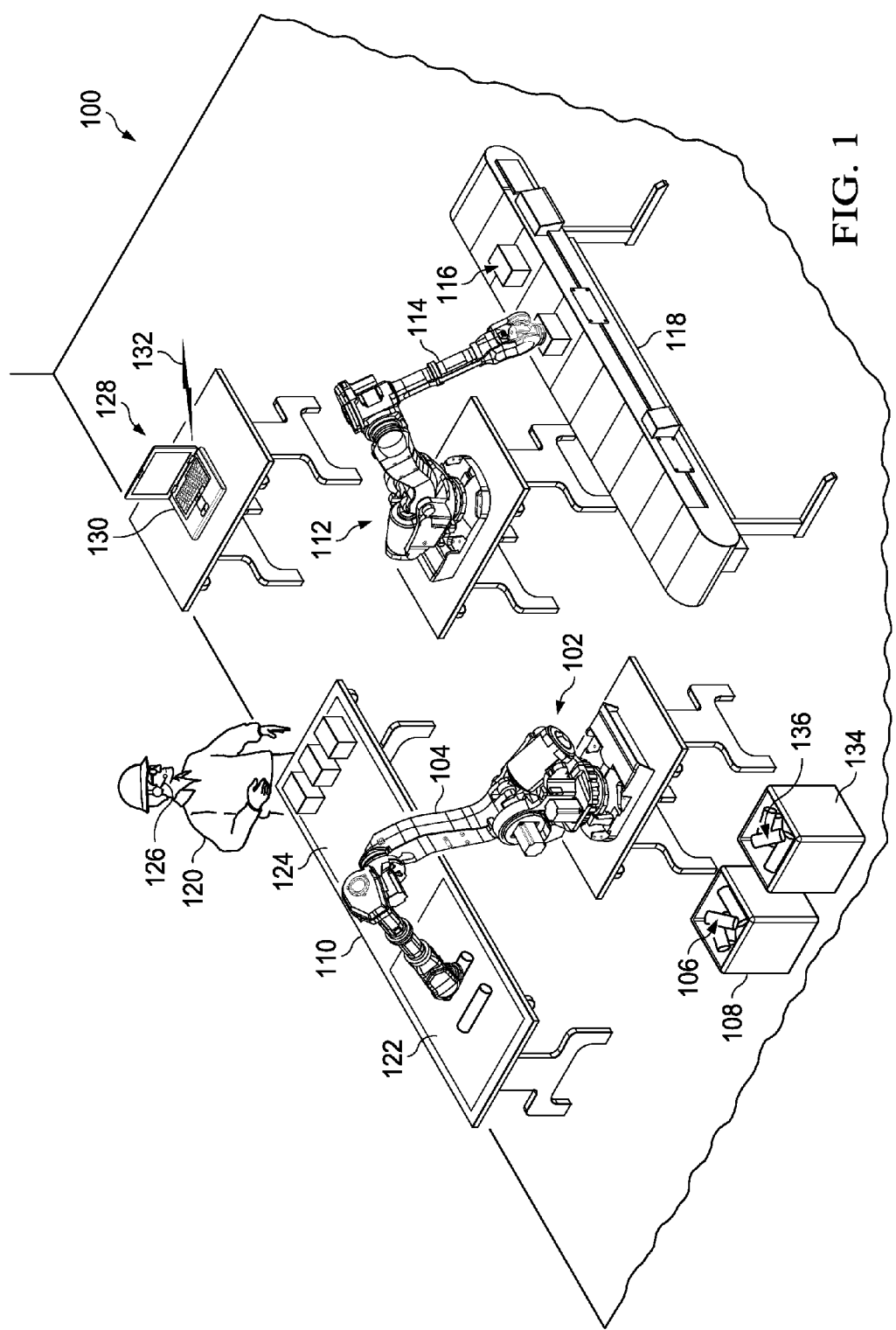
FIG. 1 is an illustration of a manufacturing environment in accordance with an illustrative embodiment.

With reference now to the figures and, in particular, with reference to FIG. 1, an illustration of a manufacturing environment is depicted in accordance with an illustrative embodiment. In this illustrative example, manufacturing environment 100 includes a robotic system in the form of pick and place robot 102. In this particular example, pick and place robot 102 includes robotic arm 104.

Pick and place robot 102 is configured to move parts 106 from bin 108 onto assembly platform 110. As another example, pick and place robot 112 is also present in manufacturing environment 100. Pick and place robot 112 includes robotic arm 114. Robotic arm 114 is configured to move parts 116 from conveyor belt 118 to assembly platform 110.

In this illustrative example, operator 120 may then perform operations to assemble a product using parts 106 and parts 116 that have been placed on assembly platform 110.

In the illustrative example, operator 120 may verbally interact with at least one of pick and place robot 102 and pick and place robot 112. As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

For example, operator 120 may provide verbal instructions to pick and place robot 102 to specify a first location, bin 108, and a second location, assembly platform 110. Operator 120 also may provide verbal instructions to pick and place robot 112 to specify a first location, conveyor belt 118, and a second location, assembly platform 110. In the illustrative example, the instructions may be specific to first area 122 on assembly platform 110 for parts 106 and to second area 124 on assembly platform 110 for parts 116.

As depicted, operator 120 may provide verbal instructions in a conversational manner without knowing commands normally used by pick and place robots that are currently used. In other words, operator 120 does not need to create or modify a program. Further, operator 120 also does not need to operate a controller to define paths of movement for pick and place robot 102 and pick and place robot 112.

In this illustrative example, the verbal instructions may be received through microphone 126 worn by operator 120 and transmitted to instruction processor 128 in computer 130 over wireless communications link 132. Of course, in some illustrative examples, instruction processor 128 may be distributed in pick and place robot 102 and pick and place robot 112 rather than in computer 130.

In this manner, operator 120 may focus on manufacturing products with parts 106 and parts 116. Less time may be needed to provide instructions to pick and place robot 102 and pick and place robot 112 to move parts 106 and parts 116 to assembly platform 110. These instructions may include instructions on how to move parts 106 and parts 116 to assembly platform 110.

For example, if bin 134 with parts 136 is to be used in place of parts 106 in bin 108 and parts 116, operator 120 may provide verbal instructions to pick and place robot 102 to pick up parts 136 from bin 134 and place parts 136 on assembly platform 110. This change in the process may be performed more quickly and the tasks performed to assemble products may resume more quickly than with current systems in which programming, teaching, or both occur with respect to pick and place robot 102.

Figure 2:
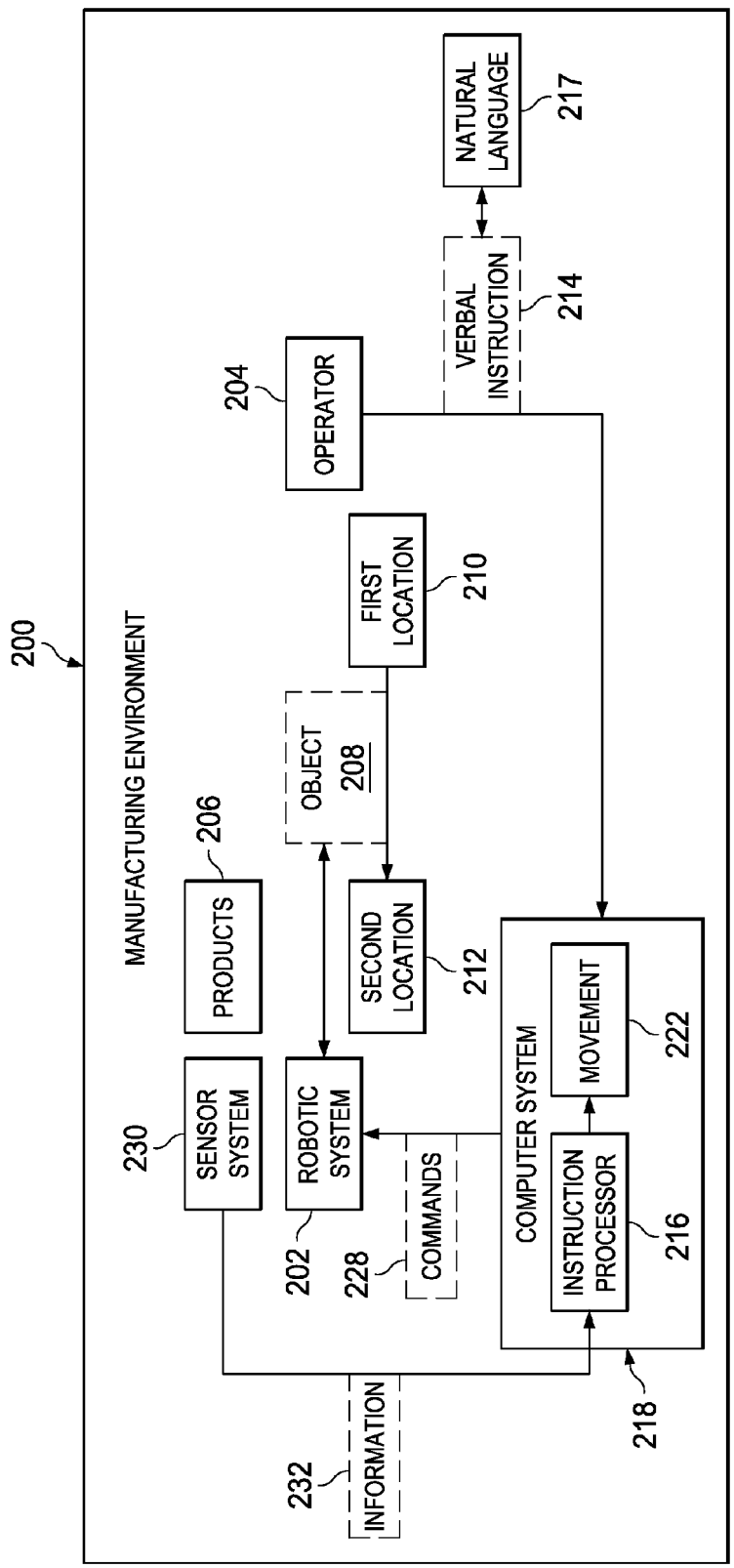
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 100 in FIG. 1 is an example of one implementation for manufacturing environment 200 shown in block form in FIG. 2.

As depicted, manufacturing environment 200 includes robotic system 202. Robotic system 202 may be used by operator 204 to manufacture products 206. In manufacturing products 206, robotic system 202 may move object 208 from first location 210 to second location 212 as part of the process of manufacturing products 206.

Object 208 may take various forms. For example, object 208 may be selected from one of a part, an assembly, a stackup of parts, a bolt, a fastener, a chip, a prepreg, a film, or other suitable types of objects. Products 206 also may take various forms. For example, products 206 may be selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, an aircraft, a ship, an aircraft engine, a housing, a computer, an antenna, a display device, or other suitable types of products.

In this illustrative example, robotic system 202 may be selected from one of a physical robotic system and a simulated robotic system. A physical robotic system may be used for actual manufacturing of products 206. A simulated robotic system may be used to train or teach operator 204 on the use of a robotic system 202.

As depicted, operator 204 may generate verbal instruction 214 to operate robotic system 202. In other words, operator 204 may speak instructions. Verbal instruction 214 is a spoken instruction received by instruction processor 216 in this illustrative example.

Verbal instruction 214 is made by operator 204 using natural language 217. In the illustrative example, natural language 217 is a form of communication used by operator 204 to communicate with other human beings. In other words, verbal instruction 214 may be made using the typical language spoken, signed, or written by human beings to each other. In other words, natural language 217 does not include commands or statements such as those found in formal languages such as in computer programming languages.

For example, when verbal instruction 214 is made using natural language 217, the instructions may be the same or similar to those given to another human operator to move a part or perform some other operation. In this form, verbal instruction 214 also may include information needed to perform the command. For example, a verbal instruction to move a part may include an identification of the part, a current location of the part, a destination for the part, a path for moving the part from the current location to the destination, and other suitable types of information.

Instruction processor 216 may be implemented in software, hardware, firmware or a combination of thereof. When software is used, the operations performed by instruction processor 216 may be implemented in program code configured to run on a processor unit. When firmware is used, the operations performed by instruction processor 216 may be implemented in program code and data and stored in persistent memory to run on a processor unit. When hardware is employed, the hardware may include circuits that operate to perform the operations in instruction processor 216.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, instruction processor 216 may be implemented in computer system 218. Computer system 218 may be one or more computers. When more than one computer is present, those computers may be in communication with each other over a communications medium such as a network. In other illustrative examples, a portion of computer system 218 may be implemented as part of robotic system 202.

As depicted, instruction processor 216 is configured to receive verbal instruction 214. In this illustrative example, verbal instruction 214 is for moving object 208 from first location 210 to second location 212. Instruction processor 216 is also configured to identify movement 222 of robotic system 202 that corresponds to verbal instruction 214 for moving object 208. In these illustrative examples, movement 222 of robotic system 202 may include movement of a component in robotic system 202 such as a robotic arm. Additionally, movement 222 may include opening or closing a gripper on the robotic arm as well as moving the robotic arm along a path.

Instruction processor 216 is also configured to identify a set of commands 228. As used herein, a "set of," when used with reference to items, means one or more items. For example, a set of commands 228 is one or more commands.

In this illustrative example, the set of commands 228 are commands used by robotic system 202 for movement 222 of robotic system 202 as identified by instruction processor 216. Instruction processor 216 is configured to send the set of commands 228 to robotic system 202. The set of commands 228 sent to robotic system 202 are in a format recognized by robotic system 202. The set of commands 228 have a format that is used by robotic system 202 to operate.

In this manner, robotic system 202 may process the set of commands 228 to move object 208 from first location 210 to second location 212 in a desired manner. This operation of robotic system 202 occurs with operator 204 using verbal instruction 214. Creating or modifying a program using the programming language for robotic system 202 is reduced or unnecessary with this type of interaction between operator 204 and robotic system 202. Additionally, operator 204 does not need to operate a device such as a handheld controller to teach robotic system 202 movement 222 for moving object 208 from first location 210 to second location 212.

In some illustrative examples, sensor system 230 also may be present in manufacturing environment 200. Sensor system 230 may be configured to provide information 232 about the environment around at least one of robotic system 202, operator 204, object 208, or other suitable things or structures that may be present in manufacturing environment 200. For example, information 232 about objects in the environment may comprise at least one of an identification of the objects in the environment, name mapping of the objects from first names used by an operator to second names used by robotic system 202, position mapping from first positions of the objects used by the operator to second positions used by robotic system 202, or descriptions of the objects. Information 232 may be used by instruction processor 216 in processing verbal instruction 214 when sensor system 230 is present.

For example, a movement by at least one of robotic system 202, operator 204, object 208, or other suitable objects may be identified using sensor system 230. The movement of the objects may be used by instruction processor 216 to identify the resulting movement 222 of robotic system 202. For example, if object 208 moves on a conveyer belt, sensor system 230 identifies the change in position of object 208 as it moves. This change in position may be used to identify movement 222 of robotic system 202 to pick up object 208, taking into account the change in position of object 208.

In these illustrative examples, sensor system 230 may take various forms. For example, sensor system 230 may include at least one of a camera, an infrared sensor, a motion detector, a global positioning system unit, a laser tracker, an ultrasonic sensor, or other suitable types of sensors that may generate information 232 for use by instruction processor 216.

Figure 3:
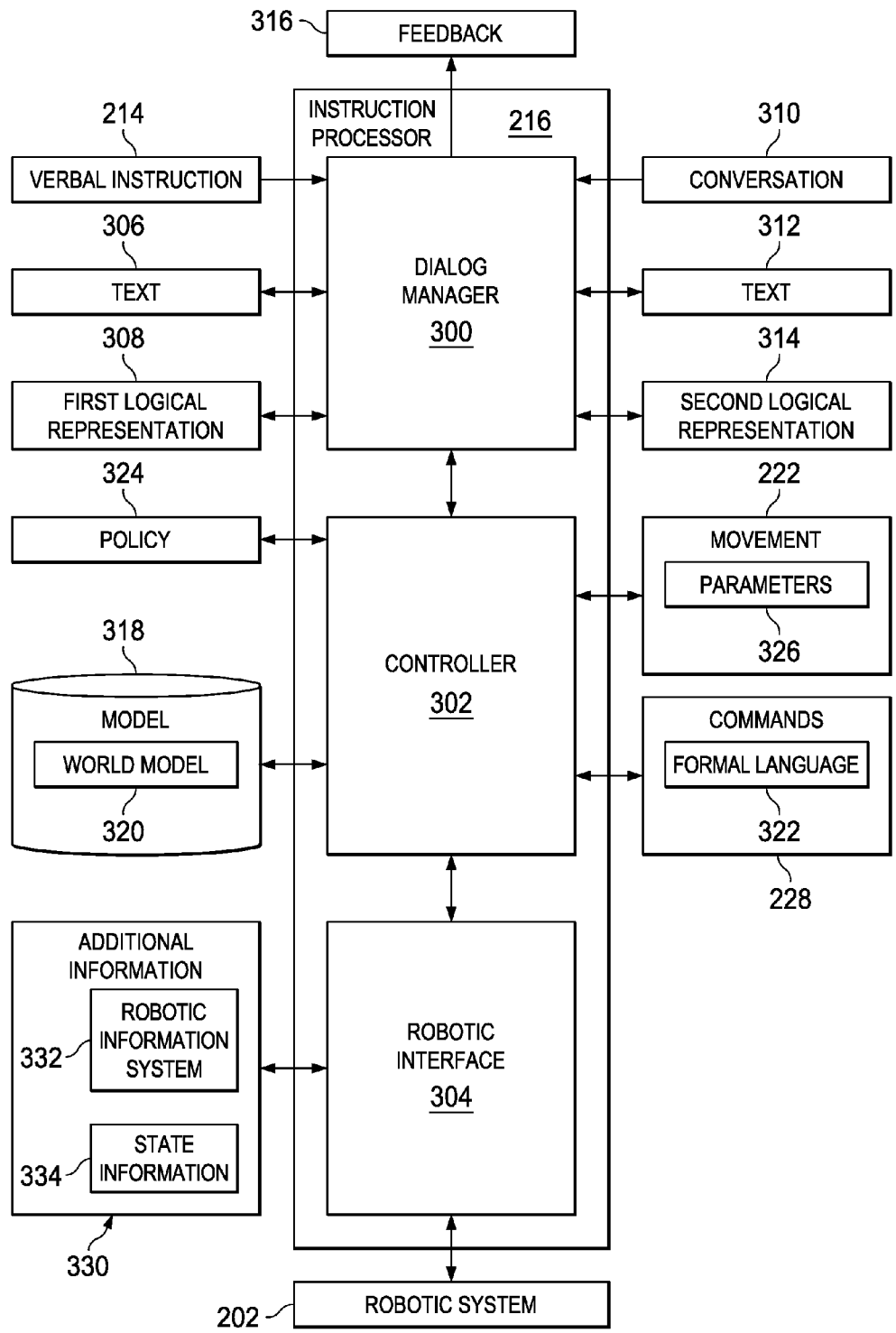
FIG. 3 is an illustration of information flow for moving objects using an instruction processor in accordance with an illustrative embodiment.

With reference now to FIG. 3, an illustration of information flow for moving objects using an instruction processor is depicted in accordance with an illustrative embodiment. In this illustrative example, instruction processor 216 includes dialog manager 300, controller 302, and robotic interface 304.

In the illustrative example, instruction processor 216 is configured to generate text 306 from verbal instruction 214. As depicted, dialog manager 300 in instruction processor 216 is configured to receive verbal instruction 214 from operator 204 as depicted in FIG. 2.

In this illustrative example, dialog manager 300 is configured to generate text 306. In other words, dialog manager 300 is configured to convert verbal instruction 214 into text 306. Any currently available speech to text processes may be used by dialog manager 300 to generate text 306 from verbal instruction 214. Text 306 comprises words in electronic form that are generated from words spoken by operator 204 in verbal instruction 214.

Additionally, dialog manager 300 is configured to process text 306 to generate first logical representation 308. Dialog manager 300 may implement various currently available processes to generate first logical representation 308. For example, without limitation, dialog manager 300 may implement an artificial intelligence system, a neural network, fuzzy logic, and other suitable systems. These systems may implement natural language processing for generating first logical representation 308 from text 306. For example, without limitation, dialog manager 300 may implement a parsing system to identify the subject, verb, and object of a sentence in a verbal instruction.

In these illustrative examples, first logical representation 308 is a computer representation of the meaning of verbal instruction 214. For example, "put two cylinders on the table" could be represented as "move-to (cylinders:2, table)."

Further, instruction processor 216 also may be configured to check the accuracy of verbal instruction 214. For example, dialog manager 300 may use conversation 310 to determine whether verbal instruction 214 is an appropriate context for the current operation of robotic system 202.

In the illustrative example, conversation 310 may be communications by operator 204 made with respect to robotic system 202. Conversation 310 may be at least one of voice, written, or other types of data communications identified prior to receiving verbal instruction 214. These communications may be, for example, prior verbal instructions made with respect to robotic system 202.

Other examples of information that may be in conversation 310 include status reports and queries. For example, a status report given by robotic system 202 may be "there are three cylinders in the basket." An example of a query made by operator 204 is "when will you finish?" Conversation 310 also may include, for example, unsensed state information. The unsensed state information may be, for example, "the conveyor is stopped." Examples of commands may include "cancel that operation," and "no, put it on the conveyor instead of on the table."

In the illustrative example, conversation 310 may be processed by dialog manager 300 to generate text 312 for conversation 310. In a similar fashion, dialog manager 300 may generate second logical representation 314 from text 312.

As depicted, dialog manager 300 may compare second logical representation 314 for text 312 generated from conversation 310 to first logical representation 308 for text 306 generated from verbal instruction 214. This comparison may be performed to determine whether verbal instruction 214 appears to be accurate in the context of conversation 310 from the comparison of second logical representation 314 with first logical representation 308.

For example, a determination may be made as to whether first logical representation 308 is inconsistent when compared to second logical representation 314. These types of comparisons may be made using various processes, such as an artificial intelligence system, a neural network, fuzzy logic, or some other suitable system.

For example, operator 204 may say "put it on the table," generating a first logical representation, "move-to(it, table)." Dialog manager 300 may use conversation 310 to deduce that "it" refers to the cylinder previously mentioned, generating a second logical representation "move-to(cylinder, table)." If no object was previously referenced, dialog manager 300 may generate a clarifying question: "which object are you referring to?"

As another example, operator 204 may say "perform that action for all cylinders." Dialog manager 300 may use conversation 310 to identify the "action" referenced by operator 204. The action in conversation 310 may be, for example, to move a cylinder from a bin to a platform.

In this example, controller 302 in instruction processor 216 uses an action referenced in conversation 310 to identify movement 222 or some other action to perform. Additionally, model 318 is used by controller 302 to determine how many cylinders are still present. The number of cylinders present is used by controller 302 to determine how many times the action is to be repeated.

If an inconsistency is present, feedback 316 may be generated by dialog manager 300. Feedback 316 may be used to indicate that an inconsistency is present between verbal instruction 214 and conversation 310. Feedback 316 may take various forms. For example, feedback 316 may be at least one of a verbal statement or an audible alert.

In the illustrative example, if an inconsistency is not present or if operator 204 confirms verbal instruction 214 even with an inconsistency, instruction processor 216 is configured to identify movement 222 for robotic system 202. In particular, controller 302 in instruction processor 216 is configured to identify movement 222. This identification is made from first logical representation 308 in the illustrative example.

In other words, first logical representation 308 defines movement 222 based on the spoken words in verbal instruction 214. In the illustrative example, movement 222 may be a movement of robotic system 202, object 208, or both.

In the illustrative examples, movement 222 may also be a set of one or more actions. The set of actions may be movement specified by verbal instruction 214. For example, verbal instruction 214 might specify moving object 208 to a position where object 208 can be inspected by sensor system 230, and only moved to second location 212 if object 208 passes inspection.

Movement 222 may take various forms. For example, movement 222 may include a path along which robotic system 202 moves. In particular, the path may be for a number of robotic arms in robotic system 202. Additionally, movement 222 may include other types of movement such as the manner in which object 208 is to be picked up, placed, or some other type of movement. Movement 222 may also involve state or parameter changes in robotic system 202, such as opening or closing a gripper or changing the speed at which robotic system 202 moves. In this illustrative example, a "number of," when used with reference to items, means one or more items. For example, a number of robotic arms is one or more robotic arms.

As depicted, movement 222 of robotic system 202 is identified by controller 302 from model 318. In the illustrative example, model 318 of the environment comprises information about objects in the environment.

The environment may be manufacturing environment 200 in FIG. 2. Model 318 is a model of the environment around at least one of robotic system 202, operator 204, object 208, or other things that may be present in manufacturing environment 200. In this example, model 318 may take the form of world model 320.

In these illustrative examples, model 318 may be updated to reflect movement of objects in the environment. In other words, model 318 may be dynamic and change during the operation of robotic system 202.

For example, movement 222 of at least one of robotic system 202, operator 204, object 208, or other objects in manufacturing environment 200 may be identified by sensor system 230 and updated within model 318. In addition, user input may be entered by operator 204 to reflect changes in the information about objects in the environment.

In addition, controller 302 may use information in model 318 to determine if first logical representation 308 is possible for performance by robotic system 202. For instance, if first logical representation 308 is represented as "move-to(cylinders:2, table)" and model 318 indicates that there is only one cylinder, then controller 302 would conclude that the command cannot be performed by robotic system 202. As a result, controller 302 sends a message to dialog manager 300 to provide feedback 316 to operator 204 that the instruction cannot be performed because there is only one cylinder.

Based on the identification of movement 222, controller 302 is configured to generate a set of commands 228. The set of commands 228 are commands for operating robotic system 202 with movement 222. The set of commands 228 may be commands using formal language 322. Formal language 322 is the language used by a device such as robotic system 202. For example, formal language 322 may be a programming language implemented in robotic system 202 to operate robotic system 202.

In this illustrative example, robotic interface 304 is configured to place the set of commands 228 into a format used by robotic system 202. Robotic system 202 may use different protocols and different commands depending on the particular implementation. For example, different manufacturers that manufacture robotic systems may employ different protocols and commands for performing movement 222 in this illustrative example.

As depicted, the set of commands 228 may be specific for a particular robotic system. If robotic system 202 is a different type of robotic system, the set of commands 228 may be converted or formatted for that different type of robotic system. In some cases, the set of commands 228 may be a generic set of commands that are converted into a specific format for robotic system 202.

In addition to model 318, controller 302 also may identify movement 222 for robotic system 202 and the set of commands 228 to cause movement 222 of robotic system 202 using policy 324. As depicted, policy 324 is a set of rules.

In this illustrative example, the set of rules may define a set of parameters 326 for movement 222. The set of parameters 326 may, for example, define limits to movement 222, weight limits for object 208, or other suitable parameters. Limits to movement 222 may include how far robotic system 202 may move, the speed at which robotic system 202 may move, or other suitable limits. Parameters 326 may also include the set of robot commands that require explicit confirmation by operator 204 before being processed for performance by robotic system 202, and those that merely require an acknowledgement to operator 204 with the set of robot commands being processed. The set of parameters 326 also may be based on tasks that are to be performed using robotic system 202.

In another illustrative example, policy 324 may include rules that define what types of objects may be moved. These rules may identify the types of objects based on at least one of size, material, shape, and other information about the objects. Of course, policy 324 may include other types of rules in addition to or in place of the ones illustrated, depending on the particular implementation. Policy 324 may also be modified by verbal instruction 214 from operator 204. For instance, operator 204 may issue verbal instruction 214 to reduce the maximum movement speed of a robotic arm in robotic system 202.

In these illustrative examples, additional information 330 in addition to the information in world model 320 also may be used to identify movement 222 for use in generating the set of commands 228. For example, additional information 330 may include at least one of robotic system information 332, state information 334 for robotic system 202, or other suitable types of information. For example, state information 334 may include the presence of an object in the robot gripper when given a command to pick a part; the first part would have to be put down before the second could be picked up. State information 334 may also include whether the robot motors are turned on or off, which may influence whether a movement may be performed. In this illustrative example, robotic system 202, dialog manager 300, and controller 302 may form a pick and place robotic system.

Figure 4:
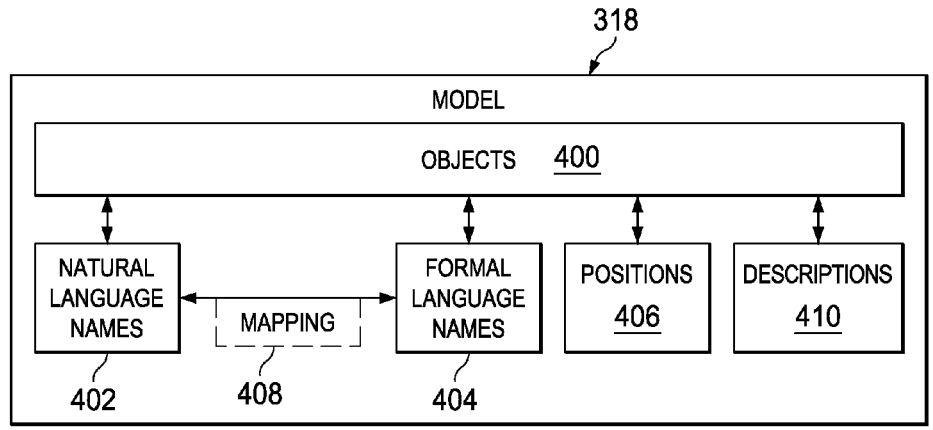
FIG. 4 is an illustration of a model in accordance with an illustrative embodiment.

Turning next to FIG. 4, an illustration of a model is depicted in accordance with an illustrative embodiment. In this illustrative example, model 318 may include a number of different types of information. For example, model 318 may include objects 400, natural language names 402, formal language names 404, and positions 406.

Objects 400 are objects that may be present in manufacturing environment 200 in FIG. 2. Objects 400 may include, for example, at least one of robotic system 202, operator 204, object 208, or other objects that may be present in manufacturing environment 200. For example, these other objects may be, like object 208, used to manufacture products, other equipment in manufacturing environment 200, other people, and other objects that may be of interest.

Natural language names 402 are names for objects 400 in the environment that may be used by operator 204 when communicating using natural language 217 in FIG. 2. Formal language names 404 are names for objects 400 used in a formal language such as in a programming language for operating robotic system 202.

Positions 406 are positions for objects 400 and manufacturing environment 200 in this illustrative example. Positions 406 identify a three-dimensional location of objects 400. Coordinates in various types of coordinate systems may be used to identify the three-dimensional location of objects 400. Additionally, positions 406 also may identify an orientation for objects 400 at the different positions.

Descriptions 410 are descriptions of objects 400. For example, descriptions 410 may include object weights, colors, or dimensions. Descriptions 410 may also include information on how to grip or pick up objects 400. Descriptions 410 may include information that may be used by instruction processor 216 to identify movement 222 for object 208. Further, descriptions 410 also may be used to provide feedback 316 to operator 204 in some illustrative examples. For example, descriptions 410 may include information that the weight of a particular part is 300 pounds. If first logical representation 308 indicates that the part should be moved and robotic system 202 can only lift 200 pounds, then controller 302 may send a message to dialog manager 300 to provide feedback 316 that the instruction could not be performed by robotic system 202.

Additionally, model 318 also includes mapping 408. As depicted, mapping 408 provides a correspondence between natural language names 402 and formal language names 404 for objects 400. Mapping 408 may be used by controller 302 from FIG. 3 to replace natural language names 402 in first logical representation 308 with either formal language names 404 or positions 406 in generating commands 228.

The illustration of manufacturing environment 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more robotic systems in addition to robotic system 202 also may be present in manufacturing environment 200. These robotic systems may be controlled by instruction processor 216 or other instruction processors. Also, although movement 222 is described with respect to robotic system 202 moving object 208, movement 222 may be applied to other objects in manufacturing environment 200.

In another illustrative example, one or more operators in addition to operator 204 also may operate robotic system 202. In other words, one or more operators also may provide verbal instructions to robotic system 202 in addition to operator 204. As another illustrative example, model 318 may be static in other illustrative examples and not updated during the operation of robotic system 202. As yet another example, verbal instruction 214 also may be used to control other aspects of robotic system 202 other than movement 222. For example, verbal instruction 214 may be used to change a state within robotic system 202. For example, operational modes of robotic system 202 may be changed.

As another illustrative example, in addition to movement 222, other actions may be taken in response to verbal instruction 214. These actions may include other action in addition to or in place of movement 222. For example, an action such as instruction processor 216 making a decision, changing a state in robotic system 202, performing a decision as to a destination of movement of object 208 in response to a sensed condition, providing status information, performing an action based on a prior action referenced in conversation 310, performing an action based on a prior object referenced in conversation 310, and other suitable actions may be performed.

These actions, in addition to or in place of movement 222, may form a sequence of actions in the illustrative examples. In this illustrative example, a sequence of actions is two or more actions that are performed in a particular order.

In this manner, verbal instruction 214 may be used to modify the state or parameters of robotic system 202 or to provide information needed by robotic system 202 in performing future instructions, as well as other actions such as movement 222.

Figure 5:
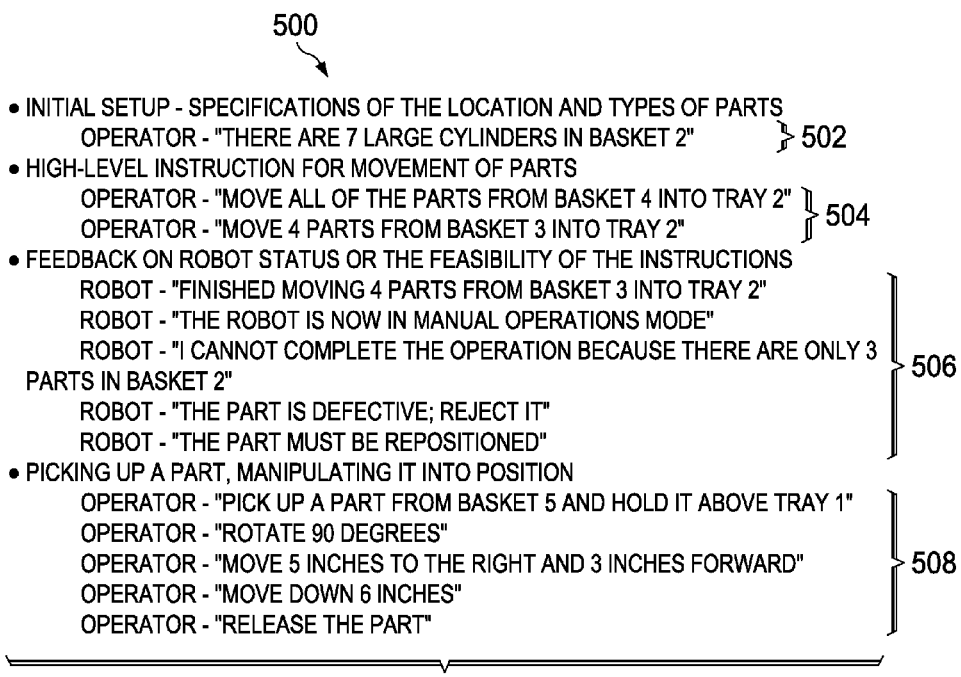
FIG. 5 is an illustration of statements that may be part of a conversation in accordance with an illustrative embodiment.

Turning next to FIG. 5, an illustration of statements that may be part of a conversation is depicted in accordance with an illustrative embodiment. In this illustrative example, conversation 500 is an example of verbal instructions made by operator 204 and feedback generated by instruction processor 216 as shown in block form in FIG. 2.

As depicted, the verbal instruction in section 502 of the conversation provides for an initial set up in manufacturing environment 200. The verbal instruction in section 502 specifies the location and types of parts. The verbal instructions in section 504 are high-level instructions for the movement of parts made by operator 204 in natural language 217.

The feedback in section 506 is a feedback on the status, feasibility, or both for the verbal instructions made by operator 204 in section 504. The instructions in section 508 are verbal instructions made by operator 204 to pick up a part, move the part, and place the part in a particular position.

As can be seen, operator 204 operates robotic system 202 using natural language 217. Operator 204 does not need to know commands or other statements in formal language 322 shown in FIG. 3 to operate robotic system 202. Additionally, operator 204 does not need to teach robotic system 202 how to make particular movements when picking up and placing parts.

Figure 6:
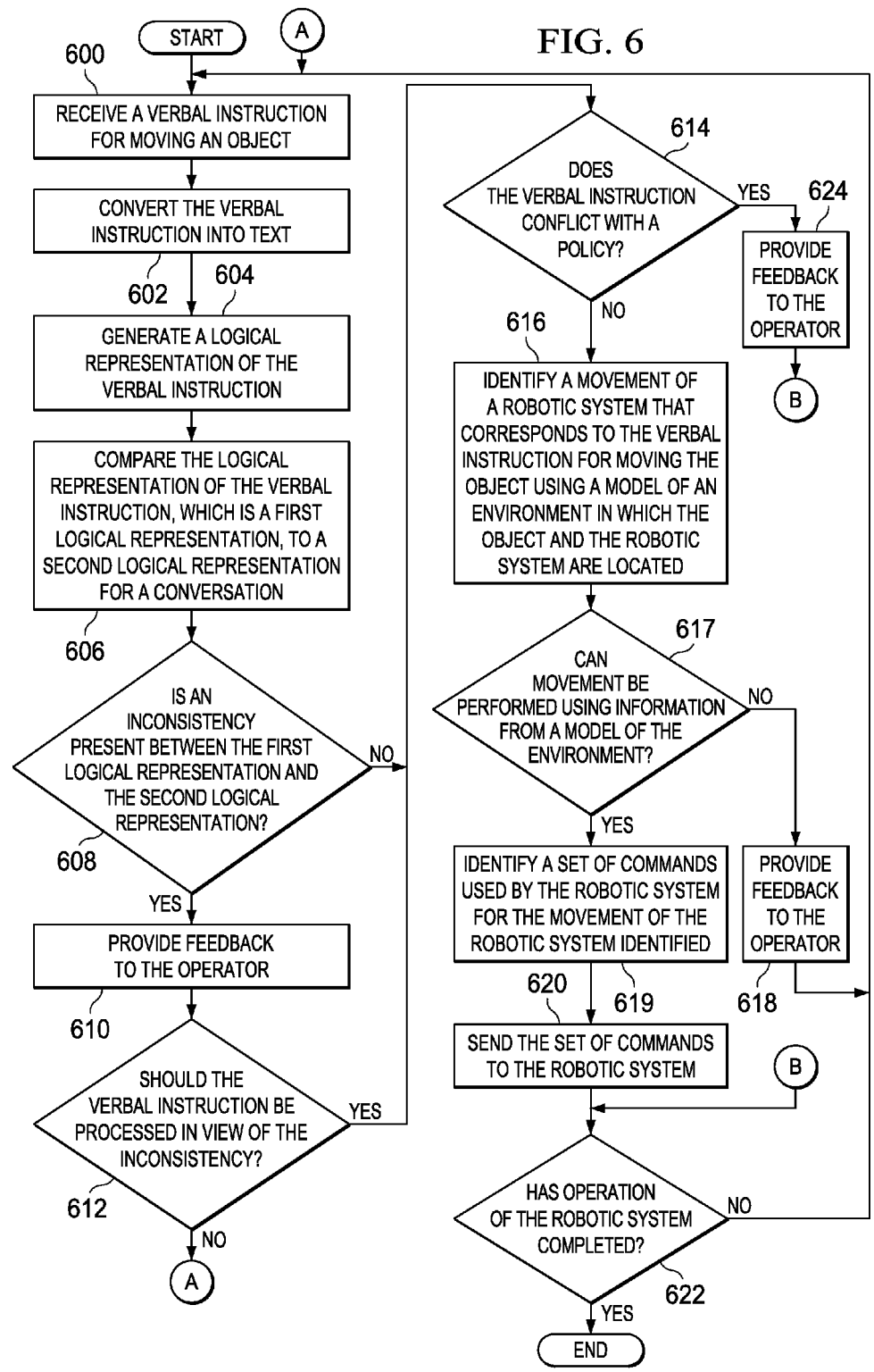
FIG. 6 is an illustration of a flowchart of a process for moving an object in accordance with an illustrative embodiment.

With reference now to FIG. 6, an illustration of a flowchart of a process for moving an object is depicted in accordance with an illustrative embodiment. The process illustrated in FIG. 6 may be implemented in manufacturing environment 200 in FIG. 2. In particular, one or more of the different operations may be implemented within instruction processor 216.

The process begins by receiving a verbal instruction for moving an object (operation 600). The process then converts the verbal instruction into text (operation 602). The process then generates a logical representation of the verbal instruction (operation 604).

The logical representation of the verbal instruction is a first logical representation and is compared to a second logical representation for a conversation (operation 606). As depicted, the conversation may be comprised of prior verbal instructions made by the operator or other operators. The conversation also may include feedback provided to the operator.

A determination is made as to whether an inconsistency is present between the first logical representation and the second logical representation (operation 608). If an inconsistency is present, feedback is provided to the operator (operation 610). This feedback may identify the inconsistency that has occurred between verbal instruction and other statements made in the conversation.

A determination is then made as to whether the verbal instruction should be processed in view of the inconsistency (operation 612). If the verbal instruction is to be processed in view of the inconsistency, a determination is made as to whether the verbal instruction conflicts with a policy (operation 614). If the verbal instruction does not conflict with the policy, the process identifies a movement of a robotic system that corresponds to the verbal instruction for moving the object using a model of an environment in which the object and the robotic system are located (operation 616).

Next, a determination is made as to whether the movement can be performed using information from a model of the environment (operation 617). For example, the operator may specify some number of parts to be moved. The determination may be made as to whether a sufficient number of parts specified by the operator are present. If the movement cannot be performed, the process provides feedback to the operator (operation 618) with the process then returning to operation 600 as described above.

Otherwise, if the movement can be performed, the process identifies a set of commands used by the robotic system for the movement of the robotic system identified (operation 619). The process then sends the set of commands to the robotic system (operation 620). The sending of the set of commands may include converting the commands into a format used by the robotic system that receives the commands. The format may be, for example, a specific protocol for the commands.

A determination is made as to whether operation of the robotic system has completed (operation 622). If operation of the robotic system is completed, the process terminates. Otherwise, the process returns to operation 600.

With reference again to operation 608, if an inconsistency is not present between the first logical representation and the second logical representation, the process proceeds to operation 614 as described above. With reference again to operation 614, if the verbal instruction conflicts with the policy, feedback is provided to the operator (operation 624). In operation 624, the verbal instruction is not processed because of the conflict with the policy. The process then proceeds to operation 622 after providing the feedback as described above. Turning back to operation 612, if the verbal instruction should not be processed in view of the inconsistency, the process then proceeds to operation 600.

Figure 7:
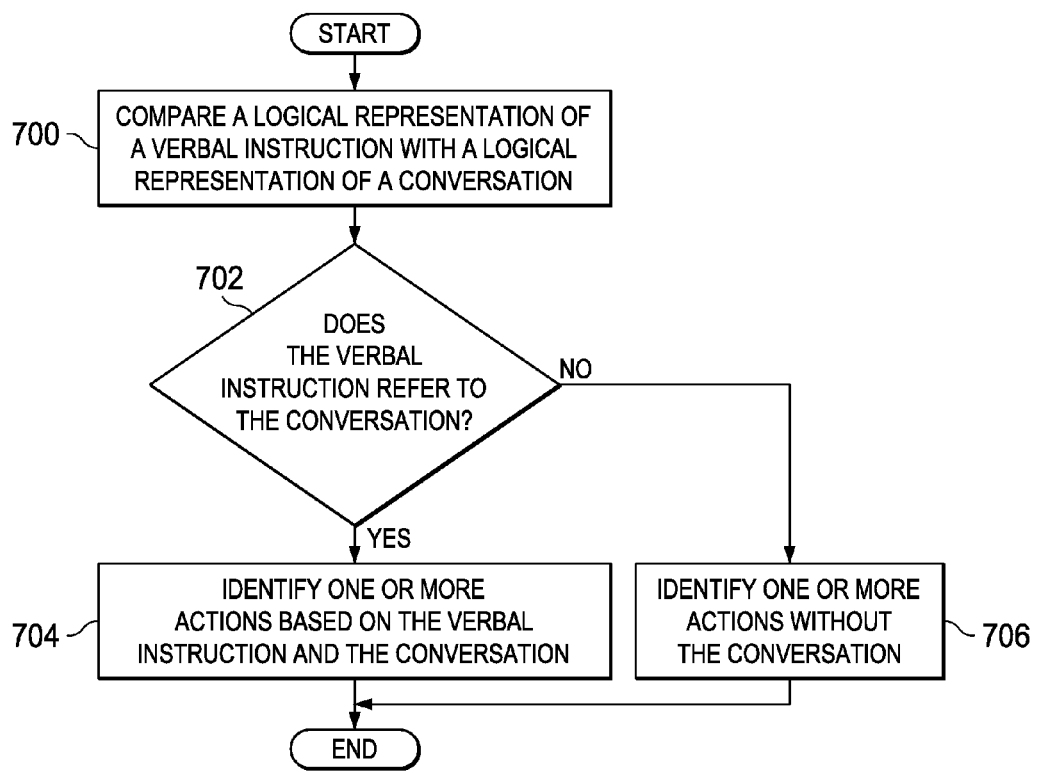
FIG. 7 is an illustration of a flowchart for identifying actions from a verbal instruction using a conversation in accordance with an illustrative embodiment.

With reference now to FIG. 7, an illustration of a flowchart for identifying actions from a verbal instruction using a conversation is depicted in accordance with an illustrative embodiment. In this illustrative example, the process in FIG. 7 may identify actions based on a conversation, such as conversation 310 in FIG. 3.

The process begins by comparing a logical representation of a verbal instruction with a logical representation of a conversation (operation 700). A determination is made as to whether the verbal instruction refers to the conversation (operation 702). This determination may be made using the comparison of the logical representation of the verbal instruction with the logical representation of the conversation. For example, if the verbal instruction refers to a fastener, a determination may be made as to whether a fastener is referenced in the conversation. As another example, if the verbal instruction references a command, a determination may be made as to whether the command reference in the verbal instruction is found in the conversation.

The determination in operation 702 may determine whether the verbal instruction references items in the conversation. These items may include, for example, at least one of a name of an object, a quantity of objects, an action, a command, a request, or some other suitable item that may be referenced by the verbal instruction in the conversation.

If the verbal instruction refers to the conversation, one or more actions are identified based on the verbal instruction and the conversation (operation 704) with the process terminating thereafter. Otherwise, the process identifies one or more actions without the conversation when the verbal instruction does not reference items in the conversation (operation 706) with the process terminating thereafter.

For example, the verbal instruction may state "repeat the prior command until all fasteners have been moved." The conversation may include the command "move a fastener from the red bin onto the platform." As a result, the action identified is to continue to move fasteners from the red bin onto a platform until no more fasteners are present in the red bin. In this example, the actions are movements of a robotic system that moves fasteners. Of course, other actions also may be identified. These other actions may include, for example, providing a status or confirmation of the verbal instruction.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, other operations that may be included but not shown may include one or more operations for an operator to resolve the inconsistency. These operations may include operations to receive additional verbal instructions from the operator.

Turning now to FIG. 8, an illustration of a block diagram of a data processing system is depicted in accordance with an illustrative embodiment. Data processing system 800 may be used to implement one or more computers in computer system 218 in FIG. 2. In this illustrative example, data processing system 800 includes communications framework 802, which provides communications between processor unit 804, memory 806, persistent storage 808, communications unit 810, input/output (I/O) unit 812, and display 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. In the illustrative example, input/output unit 812 may provide methods for capturing spoken input from the user and generating verbalized responses to the user. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a block diagram in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 900 in FIG. 9.

For example, an illustrative embodiment may be implemented during component and subassembly manufacturing 906 to manufacture parts and assemblies for use in manufacturing aircraft 1000. As another illustrative example, an illustrative embodiment may be implemented during maintenance and service 914. For example, different parts and assemblies may be manufactured using an illustrative embodiment during maintenance, refurbishment, upgrades, and other operations that may be performed during maintenance and service 914. The use of a number of the different illustrative embodiments may substantially expedite the assembly of and/or reduce the cost of aircraft 1000.

As a result, the different illustrative embodiments provide an operator with a hands-free process for moving parts using a robotic system. Additionally, the operator does not need to view the movement performed by the robotic system. This type of operation of the robotic system does not require experienced programmers to program the robotic system. Additionally, the operator does not need to teach the robotic system using a handheld device or remote terminal. As a result, the hands of the operator remain free to perform other operations while operating the robotic system.

As a result, operators may focus more on the tasks to be performed by the robotic system. This type of focus may increase the safety, efficiency, and speed in manufacturing products.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an instruction processor configured to
receive a verbal instruction for moving an object;
determine whether moving the object conflicts with a policy that includes rules that define a type of object that may be moved, a weight limit for the object, and a movement limit that includes one or more of a reach limit of a robotic system or a speed at which the robotic system may move;
in response to a determination that moving the object does not conflict with the policy, identify a movement of the robotic system that corresponds to the verbal instruction for moving the object using a model of an environment in which the object and the robotic system are located;
identify a set of commands used by the robotic system for the movement of the robotic system identified;
send the set of commands to the robotic system; and
identify a movement of the object using a sensor system as the object moves on a conveyor belt;
wherein the movement of the object is used by the instruction processor to identify a resulting movement of the robotic system.

2. The apparatus of claim 1, wherein the instruction processor comprises:
a dialog manager configured to:
receive the verbal instruction for moving the object;
convert the verbal instruction into text; and
generate a logical representation of the verbal instruction; and
a controller configured to
identify the movement of the robotic system that corresponds to the verbal instruction for moving the object from the model of the environment in which the object and robotic system are located;
identify the set of commands used by the robotic system for the movement of the robotic system identified; and
send the set of commands to the robotic system.

3. The apparatus of claim 2, wherein the instruction processor further comprises:
a robotic interface configured to place the set of commands into a format used by the robotic system.

4. The apparatus of claim 1, wherein the model of the environment comprises information about objects in the environment.

5. The apparatus of claim 4 further comprising:
a sensor system configured to generate the information about the environment.

6. The apparatus of claim 4, wherein the information comprises at least one of an identification of the objects in the environment, name mapping of the objects from first names used by an operator to second names used by the robotic system, position mapping from first positions of the objects used by the operator to second positions used by the robotic system, or descriptions of the objects.

7. The apparatus of claim 1, wherein the instruction processor is configured to provide feedback on processing of the verbal instruction.

8. The apparatus of claim 1, wherein the instruction processor is configured to determine whether the verbal instruction is performable and is configured to identify the set of commands used by the robotic system for the movement of the robotic system when the verbal instruction is performable.

9. The apparatus of claim 8, wherein a controller determines whether the verbal instruction is performable using at least one of the policy, a world model, or a conversation.

10. The apparatus of claim 1, wherein the verbal instruction is generated by one of a human operator and a computer system.

11. The apparatus of claim 1, wherein the robotic system is selected from one of a physical robotic system and a simulated robotic system.

12. A pick and place robotic system comprising:
a robotic system configured to move an object from a first location to a second location;
a dialog manager configured to:
receive a verbal instruction for moving the object from the first location to the second location;
convert the verbal instruction into text; and generate a logical representation of the verbal instruction;
compare the logical representation, which is a first logical representation, of the verbal instruction to a second logical representation for a conversation;
determine whether an inconsistency is present between the first logical representation and the second logical representation;
provide first feedback to the operator when the inconsistency is present;
determine whether moving the object conflicts with a policy that includes rules that define a type of object that may be moved, a weight limit for the object, and a movement limit that includes one or more of a reach limit of the robotic system or a speed at which the robotic system may move;
a controller configured to:
identify a movement of the robotic system in response to a determination that the object moving the object does not conflict with the policy, wherein the movement of the robotic system corresponds to the verbal instruction for moving the object from the first location to the second location from a model of an environment in which the object and the robotic system are located;

identify a set of commands used by the robotic system for the movement of the robotic system identified; and send the set of commands to the robotic system;

a robotic interface configured to:
receive the set of commands from the controller;
place the commands in a format used by the robotic system; and
send the set of commands to the robotic system; and a sensor system configured to identify a movement of the object using a sensor system as the object moves on a conveyor belt;
wherein the movement of the object is used by the controller to identify a resulting movement of the robotic system.

13. The pick and place robotic system of claim 12 further comprising:
a sensor system configured to generate information about objects in the environment for the model of the environment.

14. The pick and place robotic system of claim 12, wherein the robotic system is selected from one of a physical robotic system and a simulated robotic system.

15. A method for moving an object, the method comprising:
receiving a verbal instruction for moving the object;
determining, based on the verbal instruction, whether moving the object conflicts with a policy includes rules that define a type of object that may be moved, a weight limit for the object, and a movement limit that includes one or more of a reach limit of a robotic system or a speed at which the robotic system may move;
in response to a determination that moving the object does not conflict with the policy, identifying a movement of the robotic system that corresponds to the verbal instruction for moving the object using a model of an environment in which the object and the robotic system are located;
identifying a set of commands used by the robotic system for the movement of the robotic system identified;
sending the set of commands to the robotic system; and
identifying a movement of the object using a sensor system as the object moves on a conveyor belt;
wherein the movement of the object is used to identify a resulting movement of the robotic system.

16. The method of claim 15 further comprising:
placing the set of commands into a format used by the robotic system.

17. The method of claim 15, wherein the model of the environment comprises information about objects in the environment and further comprising:
generating the information about the environment using a sensor system.

18. The method of claim 17, wherein the information comprises at least one of an identification of the objects in the environment, name mapping of the objects from first names used by an operator to second names used by the robotic system, position mapping from first positions of the objects used by the operator to second positions used by the robotic system, or descriptions of the objects.

19. The method of claim 15 further comprising:
providing feedback on processing of the verbal instruction.

20. The method of claim 15 further comprising:
determining whether the verbal instruction is performable; and
identifying the set of commands used by the robotic system for the movement of the robotic system when the verbal instruction is performable.

21. An apparatus comprising:
an instruction processor configured to:
receive a verbal instruction for moving an object;
determine whether moving the object conflicts with a policy that includes rules that define a type of object that may be moved;
in response to a determination that moving the object does not conflict with the policy, identify a movement of a robotic system that corresponds to the verbal instruction for moving the object using a model of an environment in which the object and the robotic system are located;
identify a set of commands used by the robotic system for the movement of the robotic system identified;
identify the movement of the robotic system, an operator, and the object using the sensor system;
wherein the change in position of the object is used to identify a movement of the robotic system to pick up the object taking into account the change in position of object;
wherein the sensor system is separate from the robotic system;
the instruction processor further configured to:
compare the logical representation, which is a first logical representation, of the verbal instruction to a second logical representation for a conversation;
determine whether an inconsistency is present between the first logical representation and the second logical representation;
provide first feedback to the operator when the inconsistency is present;
wherein the first feedback identifies the inconsistency that has occurred between the verbal instruction and other statements made in the conversation;
wherein the first feedback includes a verbal statement and an audible alert; and
wherein the first feedback indicates a status and feasibility of the verbal instruction;
determine whether the verbal instruction should be processed in view of the inconsistency;
provide second feedback to the operator when the verbal instruction conflicts with the policy;
send the set of commands to the robotic system; and
identify a movement of the object using a sensor system as the object moves on a conveyor belt;
wherein the movement of the robotic system that corresponds to the verbal instruction for the moving object is identified when the verbal instruction does not conflict with the policy;
wherein the rules identify types of objects based on size, material, and shape;
wherein the policy is modified by a second verbal instruction from the operator;
wherein the second verbal instruction reduces a maximum movement speed of a robotic arm in the robotic system;
wherein the object is a part and the verbal instruction is one of a plurality of verbal instructions to pick up the part, move the part and place the part in a particular position;
wherein the plurality of instructions includes a high-level instruction in natural language for movement of multiple parts;
wherein the high-level instruction indicates to move each of the multiple parts from a basket into a tray; and wherein the movement of the object is used by the instruction processor to identify a resulting movement of the robotic system.

* * * * *